(12) United States Patent
Jang et al.

(10) Patent No.: US 10,509,262 B2
(45) Date of Patent: Dec. 17, 2019

(54) DISPLAY APPARATUS WITH LIGHT CONVERTER PATTERN

(71) Applicant: SAMSUNG ELECTRONICS CO., LTD., Suwon-si (KR)

(72) Inventors: Nae-Won Jang, Seongnam-si (KR); Young Chol Lee, Hwaseong-si (KR); Kyung Soo Park, Yongin-si (KR); Ho Seok Lee, Asan-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/002,547

(22) Filed: Jun. 7, 2018

(65) Prior Publication Data

US 2018/0356685 A1 Dec. 13, 2018

(30) Foreign Application Priority Data

Jun. 7, 2017 (KR) .................. 10-2017-0070939

(51) Int. Cl.
*F21V 8/00* (2006.01)
*G02F 1/1335* (2006.01)

(52) U.S. Cl.
CPC ..... *G02F 1/133605* (2013.01); *G02B 6/0035* (2013.01); *G02F 1/133603* (2013.01);
(Continued)

(58) Field of Classification Search
CPC ......... G02F 1/133605; G02F 1/133603; G02F 1/133606; G02F 1/133621;
(Continued)

(56) References Cited

U.S. PATENT DOCUMENTS 6,154,265 A 11/2000 Kamio et al.
2010/0073597 A1 3/2010 Bierhuizen et al.
(Continued)

FOREIGN PATENT DOCUMENTS

CN 105676341 A 6/2016
CN 105759500 A 7/2016
WO 2012/091255 A1 7/2012

OTHER PUBLICATIONS

Communication dated Sep. 3, 2018, issued by the European Patent Office in counterpart European Application No. 18175827.7.

*Primary Examiner* — Tracie Y Green
(74) *Attorney, Agent, or Firm* — Sughrue Mion, PLLC

(57) ABSTRACT

A display device includes a display panel and a plurality of light source modules arranged in parallel to a rear surface of the display panel to emit light toward the display panel, and a plurality of light source modules provided to be independently operable. A plurality of light source modules includes a modulator configured to guide light, a light source disposed on a rear surface of the modulator to generate light, a reflective member disposed opposite to the light source on a front surface of the modulator and configured to reflect the generated light to inside or the rear surface of the modulator, and a light conversion member disposed on the rear surface of the modulator and configured to convert the wavelength of light guided by the modulator, the light conversion member being formed in a predetermined pattern shape.

20 Claims, 12 Drawing Sheets

(52) U.S. Cl.
CPC .. *G02F 1/133606* (2013.01); *G02F 1/133621* (2013.01); *G02F 2001/133614* (2013.01); *G02F 2202/36* (2013.01)

(58) Field of Classification Search
CPC ..... G02F 2001/133614; G02F 2202/36; G02B 6/0035
See application file for complete search history.

(56) References Cited

U.S. PATENT DOCUMENTS

| | | | |
|---|---|---|---|
| 2012/0314141 A1* | 12/2012 | Kuromizu | G02F 1/133615 348/790 |
| 2015/0219311 A1* | 8/2015 | Cho | G02B 6/0065 362/608 |
| 2017/0003440 A1 | 1/2017 | Kim et al. | |
| 2017/0139100 A1* | 5/2017 | Nam | G02B 6/005 |

* cited by examiner

DISPLAY APPARATUS WITH LIGHT CONVERTER PATTERN

CROSS-REFERENCE TO RELATED APPLICATION

This application is based on and claims priority under 35 U.S.C. § 119 to Korean Patent Application No. 10-2017-0070939, filed on Jun. 7, 2017 in the Korean Intellectual Property Office, the disclosure of which is incorporated by reference herein in its entirety.

BACKGROUND

1. Field

The disclosure relates to a display apparatus, more particularly, to a display apparatus having an improved light source module structure.

2. Description of Related Art

Generally, a display apparatus is an apparatus configured to display a screen, and includes, for example, a monitor and a television. The display apparatus may be provided with an emissive display panel such as an organic light emitting diode (OLED) or a non-emissive display panel such as a liquid crystal display (LCD).

The present disclosure is related to a display module and a display apparatus to which the non-emissive display panel is applied. The display apparatus provided with the non-emissive display panel includes a liquid crystal display on which a screen is displayed, and a backlight unit configured to supply light toward the display panel. The backlight unit may include a light source module having a light source, and a plurality of optical sheets receiving light from the light source and guiding the light toward the display panel. The optical sheet may include, for example, a reflective sheet, a prism sheet, a diffuser sheet, and a polarizing sheet.

Light emitted from a light source can improve color reproducibility through a quantum dot (QD). Conventionally, this is implemented through a quantum dot (QD) sheet disposed on the rear side of the display panel.

As for a direct type display apparatus, since a predetermined optical distance between the light source and the light guide plate needs to be maintained, there is a disadvantage that the display apparatus may become thicker. In addition, when the QD sheet is applied to the direct type display apparatus, it may be more difficult to provide a thinner display apparatus since an additional element is required for mounting the QD sheet.

SUMMARY

Therefore, an aspect of the disclosure provides a display apparatus capable of implementing local dimming.

An aspect of the disclosure provides a display apparatus having an improved light source module structure.

An aspect of the disclosure provides a display apparatus having an improved color reproducibility.

In accordance with an aspect of the disclosure, there is provided a display apparatus including a display panel, and a plurality of light source modules disposed in parallel with a rear surface of the display panel and configured to emit light toward the display panel, wherein each of the plurality of light source modules includes a modulator configured to guide light, a light source disposed on a rear surface of the modulator and configured to generate light, a reflecting member disposed on a front surface of the modulator and opposite to the light source, and configured to reflect the generated light to an inside of the modulator or to the rear surface of the modulator, and a light conversion member disposed on the rear surface of the modulator and configured to convert a wavelength of the generated light that is guided by the modulator, the light conversion member being disposed in a predetermined pattern.

The predetermined pattern may include a plurality of shapes formed with respect to the light source as a common center.

The plurality of shapes may include a circle.

The plurality of shapes may include a polygon.

The plurality of shapes may include a first shape disposed adjacent to the light source, a second shape disposed on an outer side of the first shape, and a third shape disposed on the outer side of the second shape, wherein a distance between the second shape and third shape is greater than a distance between the first shape and second shape.

The plurality of shapes may include a first shape disposed adjacent to the light source and a second shape disposed on an outer side of the first shape, wherein a width of the second shape is less than a width of the first shape.

The modulator may include a reflecting concave surface formed on the front surface of the modulator and opposite to the light source, and recessed from the front surface of the modulator toward the rear surface of the modulator, and the reflecting member may include a first reflecting member disposed on the reflecting concave surface and a second reflecting member disposed to cover a concave space formed by the reflecting concave surface.

The display apparatus may further include a central light conversion member disposed in the concave space and configured to convert a wavelength of the light generated from the light source.

The modulator may include a light source concave portion disposed on the rear surface of the modulator and recessed from the rear surface toward the front surface of the modulator, the light source being disposed in the light source concave portion, and the display apparatus may further include a light source conversion member disposed between the light source and the light source concave portion and configured to convert a wavelength of the light generated from the light source.

The modulator may include a pattern engraved portion formed on the rear surface of the modulator to be recessed toward the front surface of the modulator, wherein the light conversion member is disposed in the pattern engraved portion.

The reflecting member may be disposed at a center of the front surface of the modulator, and the light source may be disposed at a center of the rear surface of the modulator.

The modulator may include a light guide plate.

The modulator, the light source, the reflecting member, and the light conversion member may be integrally formed with each other.

The light source may be configured to emit blue light, wherein the light conversion member includes a quantum dot (QD) configured to convert a wavelength of light, and wherein the light conversion member further includes a yellow QD configured to convert the blue light into white light.

In accordance with another aspect of the disclosure, there is provided a display apparatus including a display panel, and a plurality of light source modules disposed on a rear side of the display panel and configured to emit light toward the display panel, wherein each of the plurality of light source modules includes a modulator configured to uniformly guide light, a light source disposed at a center of a first surface of the modulator and configured to generate light, a reflecting member disposed on a second surface, opposite to the first surface, of the modulator opposite to the light source and configured to reflect the generated light, and a light converter configured to convert optical properties of light guided by the modulator, wherein the light converter includes a central conversion member disposed adjacent to the reflecting member and opposite to the light source, and a light conversion member disposed on an engraved portion, which is formed on the first surface of the modulator and configured to have a predetermined pattern, the light conversion member being disposed in a plurality of shapes with respect to the light source as a common center.

The reflecting member may be further configured to reflect light generated by the light source to an inside of the modulator or toward the first surface of the modulator.

The light source may be disposed at the center of the first surface of the modulator, wherein the reflecting member is further disposed at a center of the second surface of the modulator and opposite to the light source.

The modulator may include a reflecting concave surface disposed opposite to the light source, on the second surface of the modulator, and recessed from the second surface of the modulator toward the first surface, wherein the reflecting member includes a first reflecting member disposed on the reflecting concave surface and a second reflecting member disposed to cover a concave space formed by the reflecting concave surface, and wherein the central conversion member is disposed in the concave space.

The modulator may further include a light source concave portion formed on the first surface of the modulator and recessed from the first surface of the modulator toward the second surface of the modulator, the light source being disposed in the light source concave portion, wherein the display apparatus may further include a light source conversion member disposed between the light source and the light source concave portion and configured to convert a wavelength of light generated from the light source.

In accordance with an aspect of the disclosure, there is provided a display apparatus including a display panel, and a plurality of light source modules disposed in a plane and configured to emit light toward the display panel, wherein each of the plurality of light source modules include a light source configured to generate light, a light guide plate comprising a light source concave portion formed on a first surface of the light guide plate, the light source being disposed on the light source concave portion, and a reflecting concave portion formed on a second surface, opposite to the first surface, and configured to uniformly guide light toward the display panel, a first reflecting member disposed on the reflecting concave portion and a second reflecting member disposed to cover a concave space formed by the reflecting concave portion, the first reflecting member and the second reflecting member being configured to reflect light generated by the light source, and a light conversion member configured convert light generated by the light source or light reflected by at least one of the first reflecting member and the second reflecting member, and disposed on the first surface of the light guide plate in a predetermined pattern with respect to the light source.

BRIEF DESCRIPTION OF THE DRAWINGS

The above and other aspects, features, and advantages of certain embodiments of the present disclosure will become more apparent from the following description, taken in conjunction with the accompanying drawings of which.

DETAILED DESCRIPTION

Figure 1:
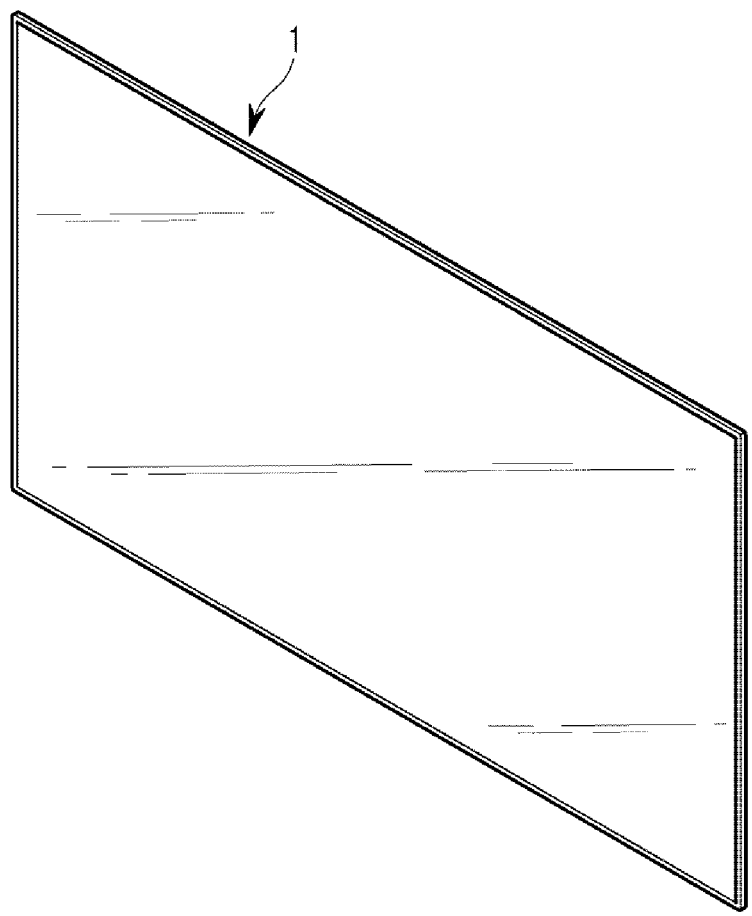
FIG. 1 is perspective view illustrating a display apparatus according to an embodiment.

The present disclosure will be described more fully hereinafter with reference to the accompanying drawings, in which embodiments of the present disclosure are shown. As those skilled in the art would realize, the described embodiments may be modified in various different ways, all without departing from the spirit or scope of the present disclosure.

Like reference numerals refer to like elements throughout the specification

The terminology used herein is for the purpose of describing embodiments only and is not intended to be limiting of the disclosure. As used herein, the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c.

It will be understood that, although the terms "first," "second," "third," etc., may be used herein to describe various elements, elements are not limited by these terms. These terms are only used to distinguish one element from another element. For example, without departing from the scope of the present disclosure, a first element may be termed as a second element, and a second element may be termed as a first element. The term of "and/or" includes a plurality of combinations of relevant items or any one item among a plurality of relevant items.

Figure 2:
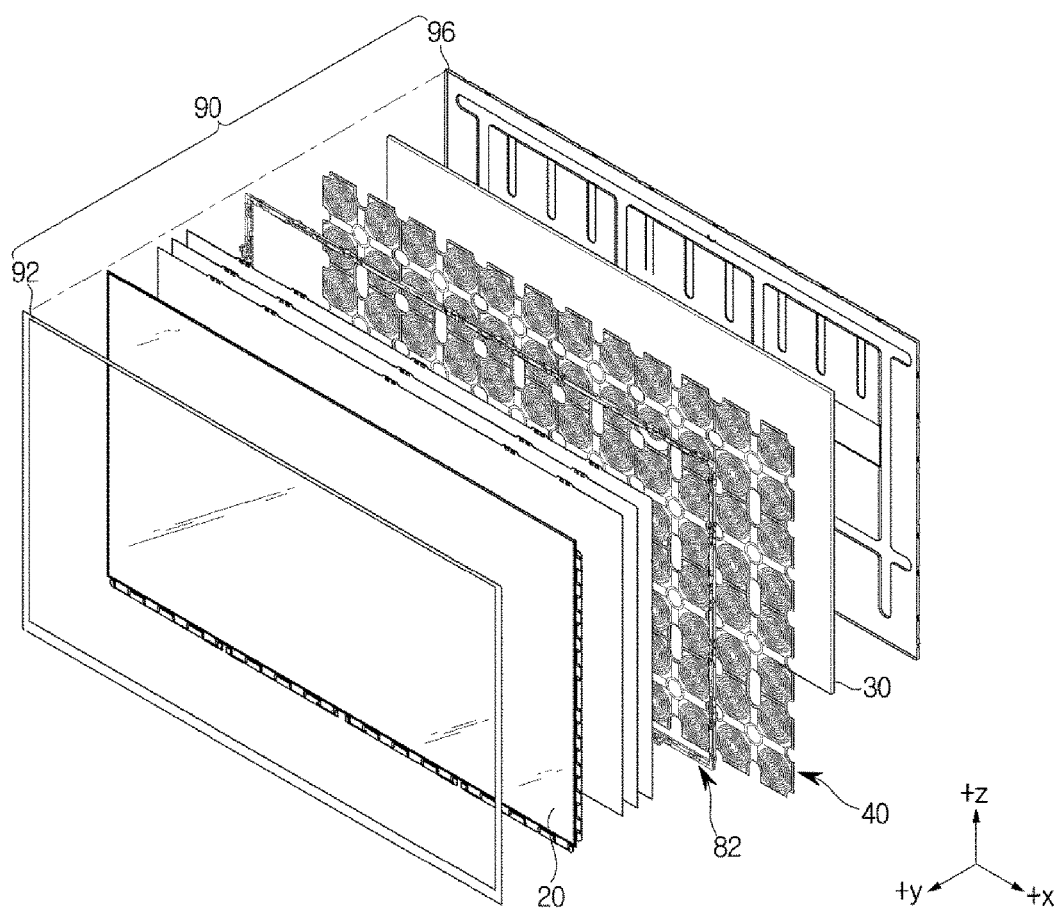
FIG. 2 is an exploded-perspective view illustrating the display apparatus according to an embodiment.

The terms such as "front side" and "front surface" are defined based on the front surface of a display panel on which images are displayed in a display device shown in FIGS. 1 and 2. The terms such as "rear side" and "rear surface" are defined as the opposite direction or surface of the "front side" and "front surface."

Figure 3:
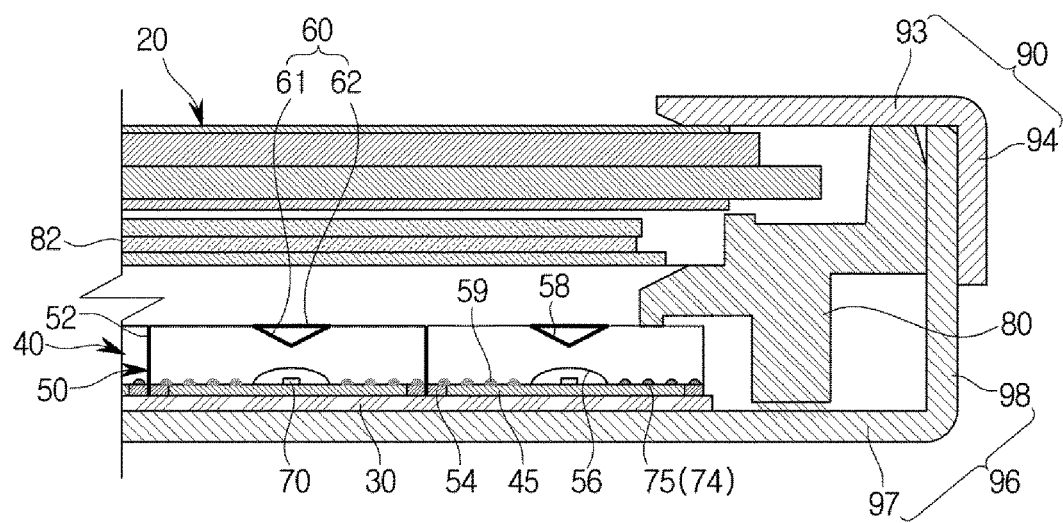
FIG. 3 is a cross-sectional view illustrating the display apparatus according to an embodiment.

FIG. 1 is perspective view illustrating a display apparatus according to an embodiment, FIG. 2 is an exploded-perspective view illustrating the display apparatus according to an embodiment, and FIG. 3 is a cross-sectional view illustrating the display apparatus according to an embodiment.

A flat display apparatus is described as an example of an embodiment of the present disclosure, but the display apparatus may be implemented by a curved display apparatus provided with a screen having a fixed curvature, a flexible display apparatus provided with a screen having a fixed curvature, a bended display apparatus provided with a screen having a fixed curvature, or a curvature variable display apparatus capable of changing the curvature of a current screen by a user input. However, embodiments of the display apparatus are not limited thereto.

The display apparatus 1 includes a display module provided therein and configured to display an image.

The display module includes a display panel 20 on which an image is displayed, and a backlight unit configured to supply light toward the display panel 20. The backlight unit may include a printed circuit board 30, a light source module 40, and an optical sheet 82. That is, the backlight unit may include the light source module 40 disposed on the rear side of the display panel 20, the optical sheet 82 disposed between the display panel 20 and the light source module 40 configured to change optical properties, a middle mold 80 configured to support the display panel 20, and a display chassis 90 configured to form an external appearance of the display apparatus. The display chassis 90 includes a top chassis 92 coupled to the front side of the middle mold 80 to maintain a state in which the display panel 20 is installed on the middle mold 80, and a bottom chassis 96 coupled to the rear side of the middle mold 80 to allow the light source module 40 to be disposed on both sides thereof.

The light source module 40 may be disposed in front of the bottom chassis 96 and radiate light toward the display panel 20. In an embodiment, as an example, a direct display method is described but the embodiments may be applied to, for example, an edge display method.

With respect to the middle mold 80, the display panel 20 and the top chassis 92 may be sequentially installed on the front side thereof, and the bottom chassis 96 may be installed on the rear side of the middle mold 80. Accordingly, the middle mold 80 may be configured to allow the display panel 20 and the bottom chassis 96 to be separated from each other while supporting the respective components.

The top chassis 92 includes a bezel portion 93 covering the front outer side of the display panel 20, and a top lateral portion 94 being bent from an end portion of the bezel portion 93 to the rear side to cover a side surface of the middle mold 80.

The bottom chassis 96 includes a rear portion 97 forming the rear surface of the display module and a bottom lateral portion 98 extending from the circumference of the rear portion 97 to the front side and then coupled to the middle mold 80. The bottom chassis 96 may be formed in a polygonal plate shape having a higher strength and formed of, for example, a metal material, which is less deformed by heat generated by a light source 70 and/or the display panel 20, wherein the metal material may include, for example, aluminum or aluminum alloy. Embodiments are not limited thereto, and the bottom chassis 96 may be formed, for example, of plastic such as poly carbonate material, or formed by adding glass fiber to plastic material.

A plurality of light source modules 40 may be mounted on the printed circuit board 30. The size of the printed circuit board 30 may correspond to the size of the display panel 20. The plurality of light source modules 40 may be arranged on the printed circuit board 30 in a plurality of rows. The plurality of light source modules 40 may be arranged on the printed circuit board 30 in planes.

The reflective sheet 45 is configured to reflect the light emitted from the light source module 40 toward the display panel 20, and may be configured to re-reflect the light, which is re-reflected by the optical sheet 82 or the display panel 20, toward the display panel 20. The reflective sheet 45 is disposed in the front side of the printed circuit board 30 and reflects the leaked light toward the display panel 20 to improve the light efficiency of the display apparatus. The reflective sheet 45 may be disposed between the printed circuit board 30 and the light source module 40. The reflective sheet 45 may be coated with a white or silver high reflective coating agent such as, for example, silver and titanium dioxide (TiO2). The reflective sheet 45 may include a reflector.

The optical sheet 82 may be configured to allow light, which is light radiated from the light source module 40 to be directed toward the display panel 20, to have a uniform luminance. Light having a uniform luminance that passes through the optical sheet 82 is incident on the display panel 20. The optical sheet 82 may include, for example, a protective sheet, a prism sheet, or a diffuser sheet. The optical sheet 82 may include at least one sheet.

Figure 4A:
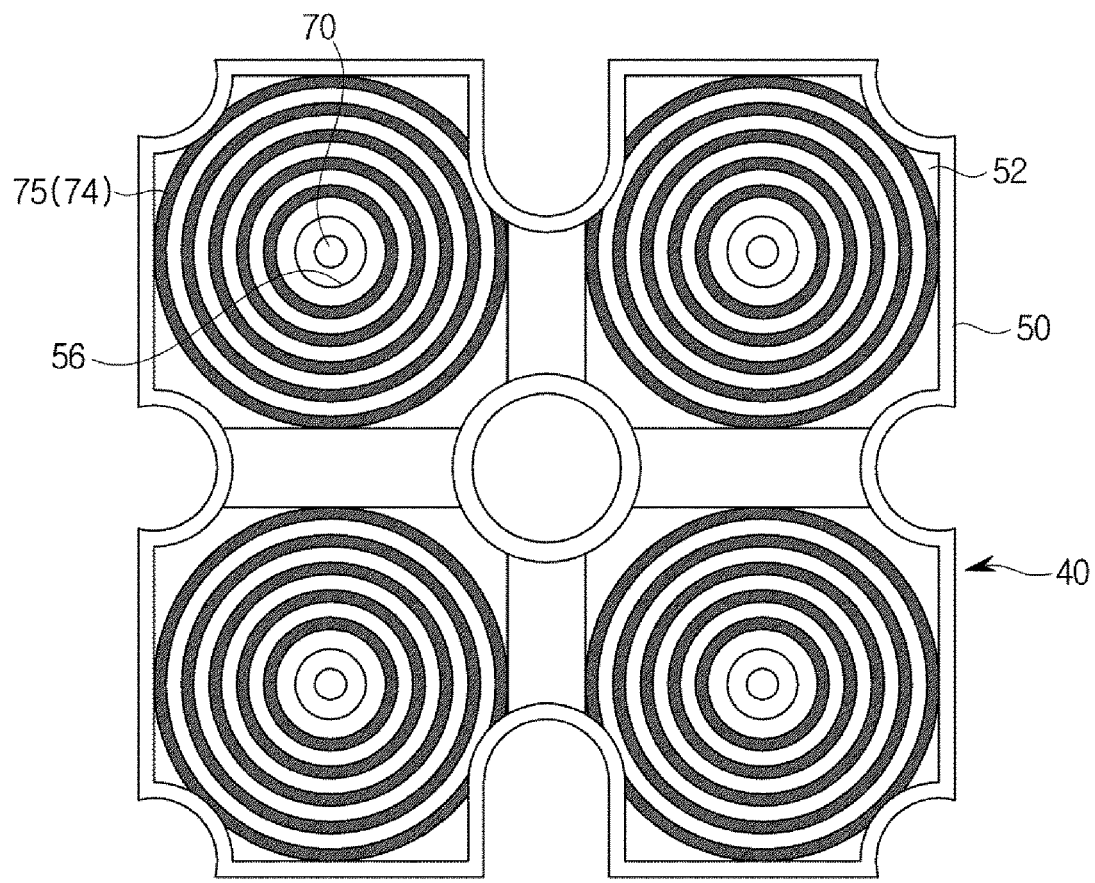
FIG. 4A is a rear-view illustrating the light source module according to an embodiment.
Figure 4B:
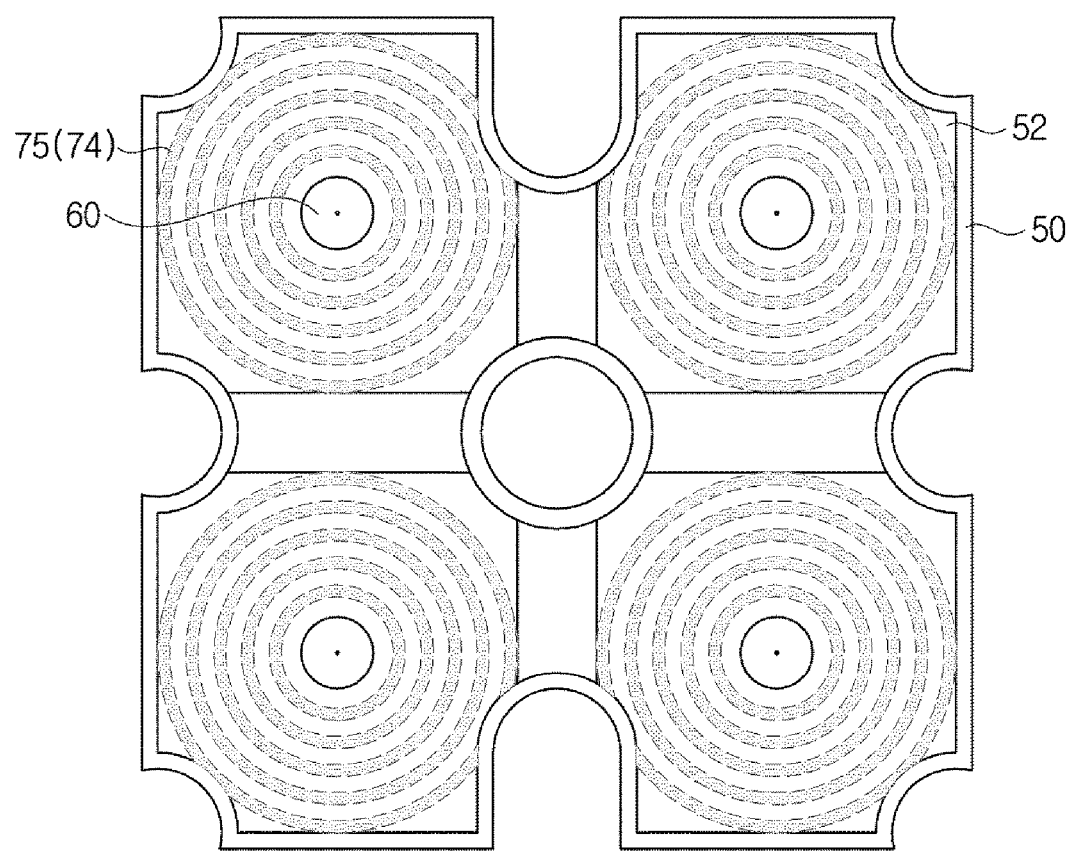
FIG. 4B is a front-view illustrating the light source module according to an embodiment.
Figure 5:
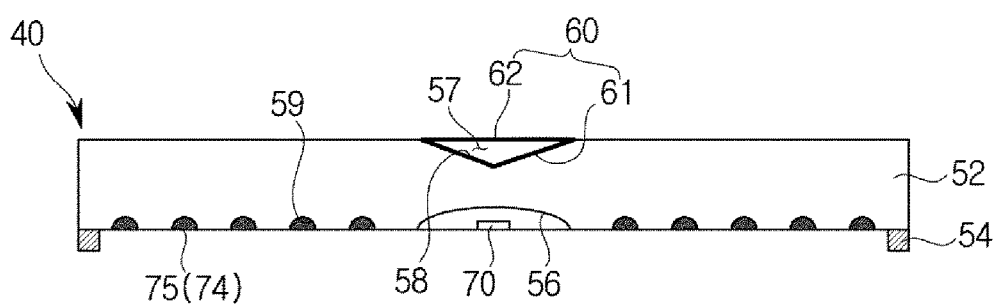
FIG. 5 is a cross-sectional view illustrating the light source module according to an embodiment.

FIG. 4A is a rear-view illustrating the light source module according to an embodiment, FIG. 4B is a front-view illustrating the light source module according to an embodiment, and FIG. 5 is a cross-sectional view illustrating the light source module according to an embodiment.

The light source module 40 may be arranged on the rear side of the display panel 20. The plurality of light source modules 40 may be arranged where the size of the plurality of light source modules 40 correspond to the size of the display panel 20.

The light source module 40 may include a modulator 50, a light source 70, a reflecting member 60, and a light converter 74.

The modulator 50 may be configured to allow light to be transmitted. The modulator 50 is configured to uniformly guide light, which is generated by the light source 70. The modulator 50 may include a light guide plate.

The modulator 50 may include at least one support leg 54 protruding from a surface of the modulator 50 facing the printed circuit board 30. The support leg 54 may separate a modular body 52 from the printed circuit board 30 by a certain distance.

The light source 70 may be disposed at one side of the modulator 50. That is, the light source 70 may be disposed on the rear surface of the modulator 50. The light source 70 may be disposed on the rear surface of the modulator 50 opposite to and facing the display panel 20. The modulator 50 may include a light source concave portion 56 formed to allow the light source 70 to be disposed on the rear surface. The light source concave portion 56 may be recessed to the front side opposite to the rear surface of the modulator 50. The light source 70 may be inserted into the light source concave portion 56. The light source concave portion 56 may be formed as a curved surface and configured as a lens to disperse light generated from the light source 70.

The light source 70 may be disposed at the center of the rear surface of the modulator 50, and may more effectively disperse the light to the modulator 50. Since the plurality of light source modules 40 each including with the modulator 50 and the light source 70 are arranged in parallel on the rear side of the display panel 20, it may be possible to uniformly disperse the light toward the display panel 20, and thus, uniformity of the image quality over the entire surface of the display panel 20 may be maintained.

The light source 70 may include a light emitting element configured to emit, for example, blue light. Blue light may be converted into white light by the light converter 74.

The reflecting member 60 may be disposed on the front surface of the modulator 50. Particularly, the reflecting member 60 may be disposed at the center of the front surface of the modulator 50 opposite to the light source 70. The reflecting member 60 may be arranged at the front surface of the modulator 50 to face the light source 70. Since the reflecting member 60 may be configured to re-reflects light, which is generated from the light source 70, to the inside of the modulator 50 or the rear surface of the modulator 50, the width between the front surface and the rear surface of the light source module 40 may be reduced or minimized. That is, since light is dispersed or reflected to the inside of the modulator 50 by the reflecting member 60, an amount of light, which is totally reflected inside the modulator 50, may be increased, the width between the front surface and the rear surface of the light source module 40 may be reduced or minimized.

The light converter 74 may be arranged in the modulator 50 and configured to convert the wavelength of light. The light converter 74 may include, for example, a quantum dot (QD). The light converter 74 may be disposed on a propagation path of light in the modulator 50 to convert the wavelength of light.

The light source 70 may include a light source emitting blue light. The light converter 74 may include a quantum dot (QD) formed in yellow. The blue light emitted from the blue light source may be converted into the white light while passing through a yellow quantum dot.

When an electron receives energy, the electrons in the electric field become excited by the conduction band. The electron has the property of radiating energy into light when the electron loses energy again and falls to the galvanic field. The quantum dot generates strong fluorescent light in a narrow wavelength band. It is possible to generate all colors of visible light according to the size of the quantum dots. In addition, quantum dot (QD) is a material having no color loss and high color reproducibility because it generates natural color by itself. The smaller the size of a quantum dot (QD), the shorter the wavelength of light generated. The larger the particle size of the quantum dot (QD), the longer the wavelength of light generated. The quantum dot (QD) may be a compound such as, for example, cadmium selenide (Cdse), cadmium sulfide (Cds), cadmium teleide (Cdte), zinc selenide (ZnSe), zinc tennate (ZnTe) and zinc sulfide (ZnS).

The light converter 74 may include a light conversion member 75. The light conversion member 75 may be disposed on a surface of the modulator 50, wherein the surface is the same as a surface on which the light source 70 is disposed. That is, the light conversion member 75 may be disposed on the rear surface of the modulator 50. The light conversion member 75 may be formed in the shape of a certain pattern and disposed in the modulator 50. According to an embodiment, the light conversion member 75 may be disposed in a plurality of circular shapes with respect to the light source 70. That is, the light conversion member 75 may be formed such that a plurality of circular shapes is concentrically disposed with respect to the light source 70. The light conversion member 75 formed in the plurality of circular shapes may be disposed with a certain thickness.

The modulator 50, the light source 70, the reflecting member 60, and the light converter 74 may be integrally formed with each other. In the plurality of light source modules 40, a wavelength of light generated from each light source 70 may be converted by the light converter 74 and then the light may be uniformly emitted to the front side of the modulator 50 by the modulator 50 and the reflecting member 60. Since the plurality of light source module 40 may be controlled independently and a contrast ratio between adjacent light source modules 40 may be increased or maximized, it may be possible to realize the image quality having a higher depth perception. In addition, it may be possible to realize the color by using the optical system to which quantum dot (QD) is applied, and thus, reproduction of the color may be improved. Since the light converter 74, the modulator 50 and the light source may be integrated as a single module, maintenance of the display apparatus may be more efficient.

The modulator 50 may include a pattern concave portion 59 corresponding to the light conversion member 75. The pattern concave portion 59 may be formed to be recessed on the surface of the modulator 50 to allow the light conversion member 75 to be filled therein. According to an embodiment the pattern concave portion 59 may be formed on the rear surface of the modulator 50. That is, the light conversion member 75 may be inserted into the pattern concave portion 59 formed in an engraved shape on the modulator 50. The pattern concave portion 59 may be formed such that a plurality of circular shapes is concentrically disposed, corresponding to the arrangement of the light conversion member 75. The light conversion member 75 may be filled in the pattern concave portion 59. Particularly, the light conversion member 75 may include a quantum dot (QD) resin. The QD resin may be applied to the pattern concave portion 59 and then harden so the QD resin is disposed in the pattern concave portion 59. According to an embodiment, the light conversion member 75 may be filled in the engraved shape disposed in the modulator 50, but is not limited thereto.

The reflecting member 60 may include a first reflecting member 61 and a second reflecting member 62. The modulator 50 may include a reflecting concave surface 58. The reflective concave surface 58 may be recessed toward the rear surface opposite to the front surface of the modulator 50. The reflecting concave surface 58 may be formed in the shape of a cone, or may be recessed in the shape of a part of an ellipse. The first reflecting member 61 may be formed on the reflecting concave surface 58. The second reflecting member 62 may be provided to cover a concave space 57 formed by the reflecting concave surface 58.

The light generated by the light source 70, which is directed toward the reflecting member 60, may at least partly be reflected toward the rear surface of the modulator 50 by the first reflecting member 61. Light that is not reflected by the first reflecting member 61 may be reflected by the second reflecting member 62 and reflected toward the rear surface of the modulator 50.

According to an embodiment, the reflecting member 60 may include at least one of the first reflecting member 61 and the second reflecting member 62.

Hereinafter, the operation of the light source module 40 provided in the display apparatus 1 according to an embodiment will be described.

When light is generated by the light source 70, the generated light may propagate to the inside of the modulator 50. At least a portion of the generated light may be reflected by the reflecting member 60 facing the light source 70 and then propagate to the inside of the modulator 50 or toward the rear surface of the modulator 50. A wavelength of light, which is totally internally reflected by the surface of the modulator 50 or reflected by the reflecting member 60, may be converted by the light converter 74 disposed on the rear surface of the modulator 50. The converted light may be incident on the display panel 20.

Figure 6:
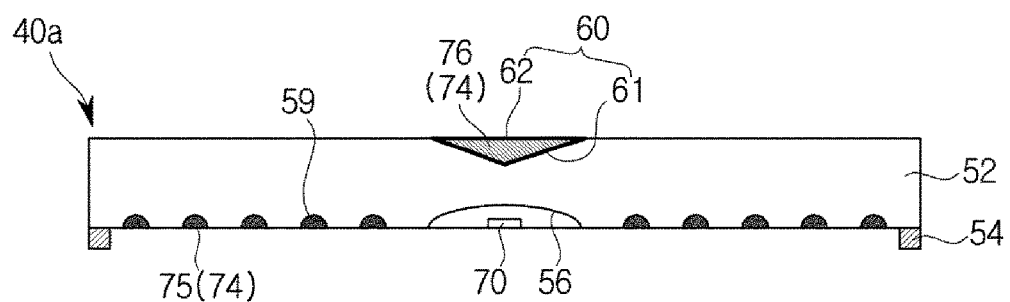
FIG. 6 is a cross-sectional view illustrating a light source module of a display apparatus according to an embodiment.

FIG. 6 is a cross-sectional view illustrating a light source module of a display apparatus according to an embodiment.

A light source module 40a may include a light converter 74.

The light converter 74 may be arranged in a modulator 50 and configured to convert the wavelength of light. The light converter 74 may include a quantum dot (QD). The light converter 74 may be disposed on a propagation path of light in the modulator 50 to convert the wavelength of light.

The light converter 74 may include a light conversion member 75 and a central light conversion member 76.

The modulator 50 may include a reflecting concave surface 58 on which first reflecting member 61 and the second reflecting member 62 are disposed. The central light conversion member 76 may be disposed in a concave space 57 formed by the reflecting concave surface 58.

A wavelength of at least a part of the light generated from the light source 70 may be converted by the central light conversion member 76 while passing through the first reflecting member 61 and the second reflecting member 62. A wavelength of light, which is not converted by the central light conversion member 76, may be converted by the light conversion member 75. Accordingly, the optical conversion efficiency of the light converter 74 may be improved, and thus, it may be possible to improve the color reproduction performance of the display apparatus.

Figure 7:
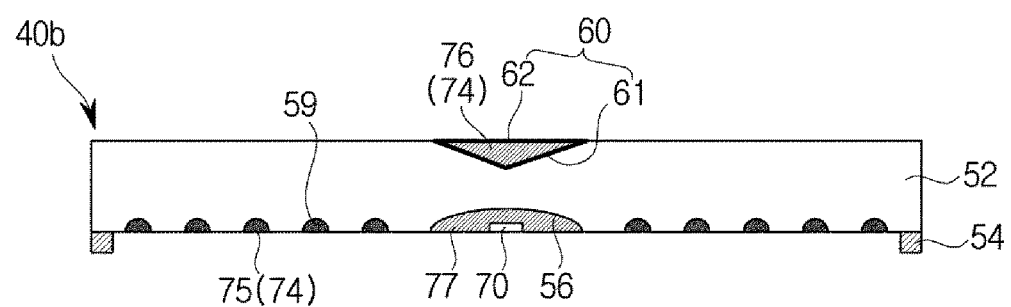
FIG. 7 is a cross-sectional view illustrating a light source module of a display apparatus according to an embodiment.

FIG. 7 is a cross-sectional view illustrating a light source module of a display apparatus according to an embodiment.

A light source module 40b may include a light converter 74.

The light source 70 may be disposed at one side of the modulator 50. For example, the light source 70 may be disposed on the rear surface of the modulator 50. The light source 70 may be disposed on the rear surface of the modulator 50 opposite to and facing the display panel 20. The modulator 50 may include a light source concave portion 56 configured to allow the light source 70 to be disposed on the rear surface. The light source concave portion 56 may be recessed to the front side opposite to the rear surface of the modulator 50. The light source 70 may be inserted into the light source concave portion 56. The light source concave portion 56 may be formed as a curved surface and configured as a lens to disperse light generated from the light source 70.

The light converter 74 may include a light conversion member 75, a central light conversion member 76, and a light source conversion member 77.

The light source conversion member 77 may be disposed in the light source concave portion 56. The light source conversion member 77 may be configured to convert at least a part of light, which is generated from the light source 70. The light source conversion member 77 may be disposed between the light source 70 and the light source concave portion 56.

A wavelength of the light generated from the light source 70 may be converted by passing through the light source conversion member 77, the central light conversion member 76, and the light conversion member 75. Accordingly, the color reproduction performance of the display apparatus may be improved.

Figure 8:
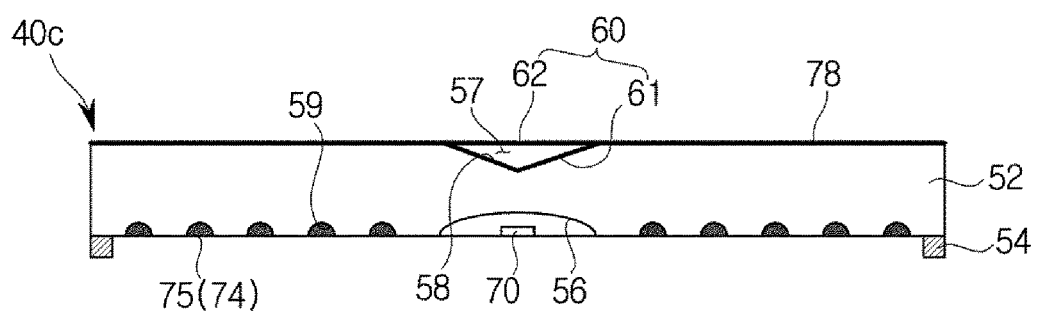
FIG. 8 is a cross-sectional view illustrating a light source module of a display apparatus according to an embodiment.

FIG. 8 is a cross-sectional view illustrating a light source module of a display apparatus according to an embodiment.

A light source module 40c may include a light converter 74.

The light source 70 may be disposed at one side of the modulator 50. For example, the light source 70 may be disposed on the rear surface of the modulator 50. The light source 70 may be disposed on the rear surface of the modulator 50 opposite to and facing the display panel 20. The modulator 50 may include a light source concave portion 56 configured to allow the light source 70 to be disposed on the rear surface of the modulator 50. The light source concave portion 56 may be recessed to the front side opposite to the rear surface of the modulator 50. The light source 70 may be inserted into the light source concave portion 56. The light source concave portion 56 may be formed as a curved surface and configured as a lens to disperse light generated from the light source 70.

The light converter 74 may include a light conversion member 75, and a front conversion member 78.

The front conversion member 78 may be disposed on the front surface of the modulator 50. The front conversion member 78 may be configured such that a wavelength of light, which is directed to the front side from the inside of the modulator 50, is converted and then directed toward the display panel 20. The front conversion member 78 may be disposed on at least a part of the front surface of the modulator 50.

A wavelength of the light generated from the light source 70 may be converted by passing through the light conversion member 75 and the front conversion member 78. Accordingly, the color reproduction performance of the display apparatus may be improved.

Figure 9:
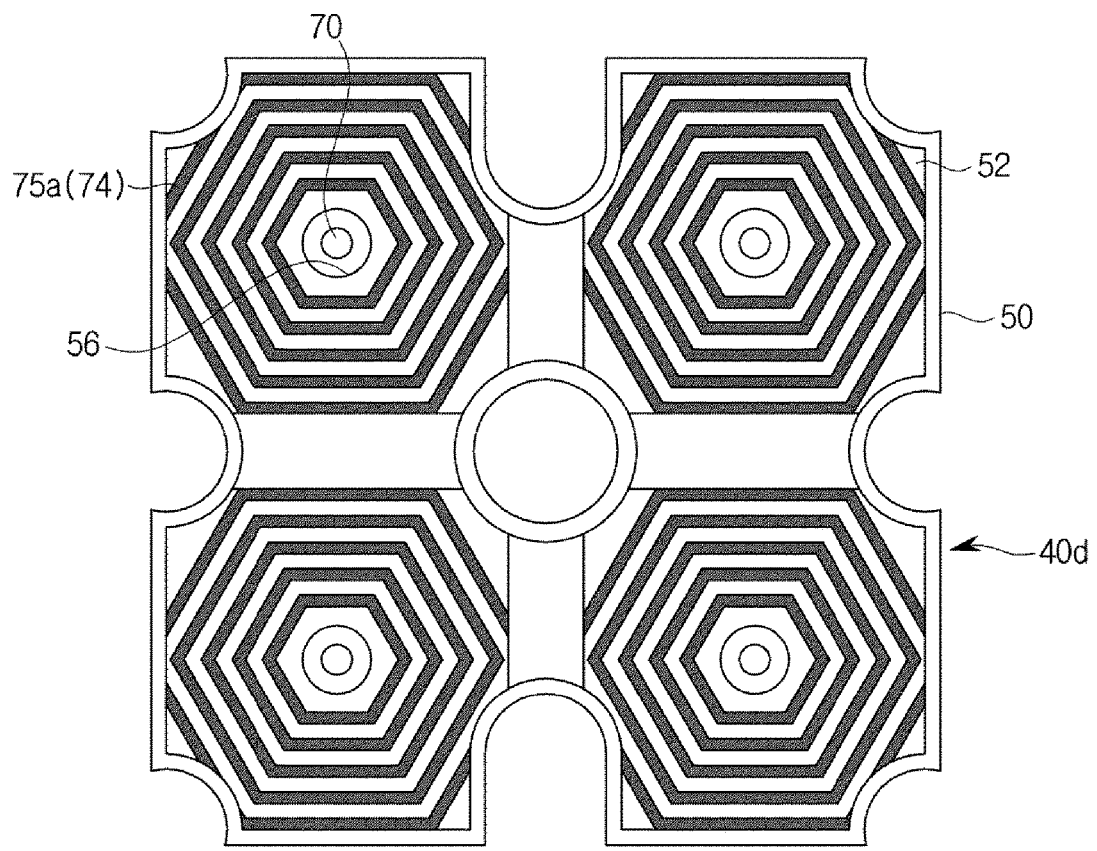
FIG. 9 is a rear-view illustrating a light source module of a display apparatus according to an embodiment.

FIG. 9 is a rear-view illustrating a light source module of a display apparatus according to an embodiment.

A light source module 40d may include a light converter 74.

The light converter 74 may include a light conversion member 75a. The light conversion member 75a may be disposed on the same surface as a surface on which the light source 70 is disposed in the modulator 50. For example, the light conversion member 75a may be disposed on the rear surface of the modulator 50. The light conversion member 75a may be disposed in the modulator 50 in a shape of a certain pattern.

According to the embodiment, the light conversion member 75a may be disposed in a plurality of polygon shapes on the modulator 50 with respect to the light source 70 as a common center. For example, the light conversion member 75a may be formed in a shape of a plurality of hexagons, but embodiments are not limited thereto.

Figure 10:
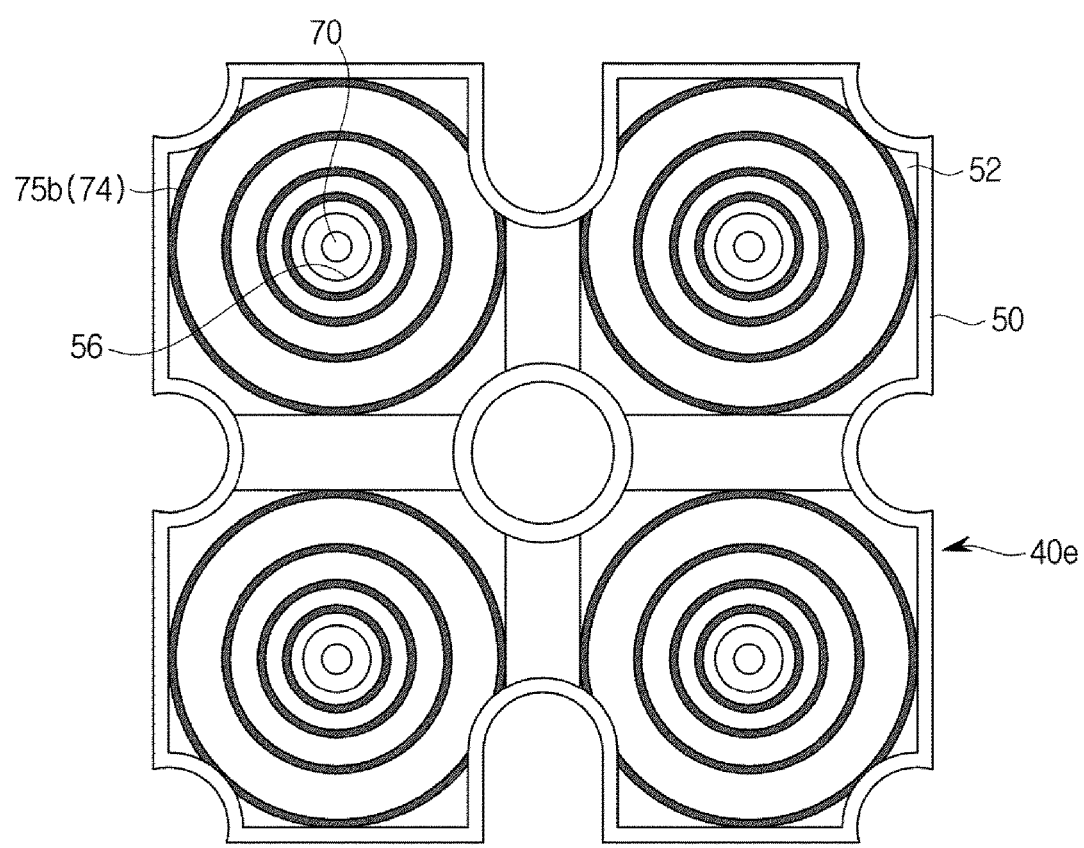
FIG. 10 is a front-view illustrating a light source module of a display apparatus according to an embodiment.

FIG. 10 is a view illustrating a light source module of a display apparatus according to another embodiment when viewing from the rear side.

A light source module 40e may include a light converter 74.

The light converter 74 may include a light conversion member 75b. The light conversion member 75b may be disposed on a surface of the modulator 50, wherein the surface is the same as a surface on which the light source 70 is disposed. For example, the light conversion member 75b may be disposed on the rear surface of the modulator 50. The light conversion member 75 may be formed to be disposed in a certain pattern on the modulator 50. According to the embodiment, the light conversion member 75b may be disposed in a plurality of circular shapes on the modulator 50 with respect to the light source 70 as a common center. That is, the light conversion member 75b may be formed such that the plurality of circular shapes is concentrically disposed with respect to the light source 70. The light conversion member 75b formed in the plurality of circular shapes may be disposed with a certain thickness.

The pattern of the light conversion member 75b may be formed such that a distance between the circular shapes of the conversion member 75b adjacent to the light source 70 is narrower than a distance between the circular shapes of the conversion member 75 disposed further away from the light source 70. That is, the light conversion member 75b may include a first shape formed around the light source 70, a second shape disposed on the outer side of the first shape, and a third shape disposed on the outer side of the second shape. The distance between the second and third shapes may be larger than the distance between the first and second shapes, and the distance between the first and second shapes may be larger than the distance between the first shape and the light source 70.

The configuration as illustrated in FIG. 10 may improve the optical conversion efficiency in a region adjacent to the light source 70 where the intensity of light is relatively high.

Figure 11:
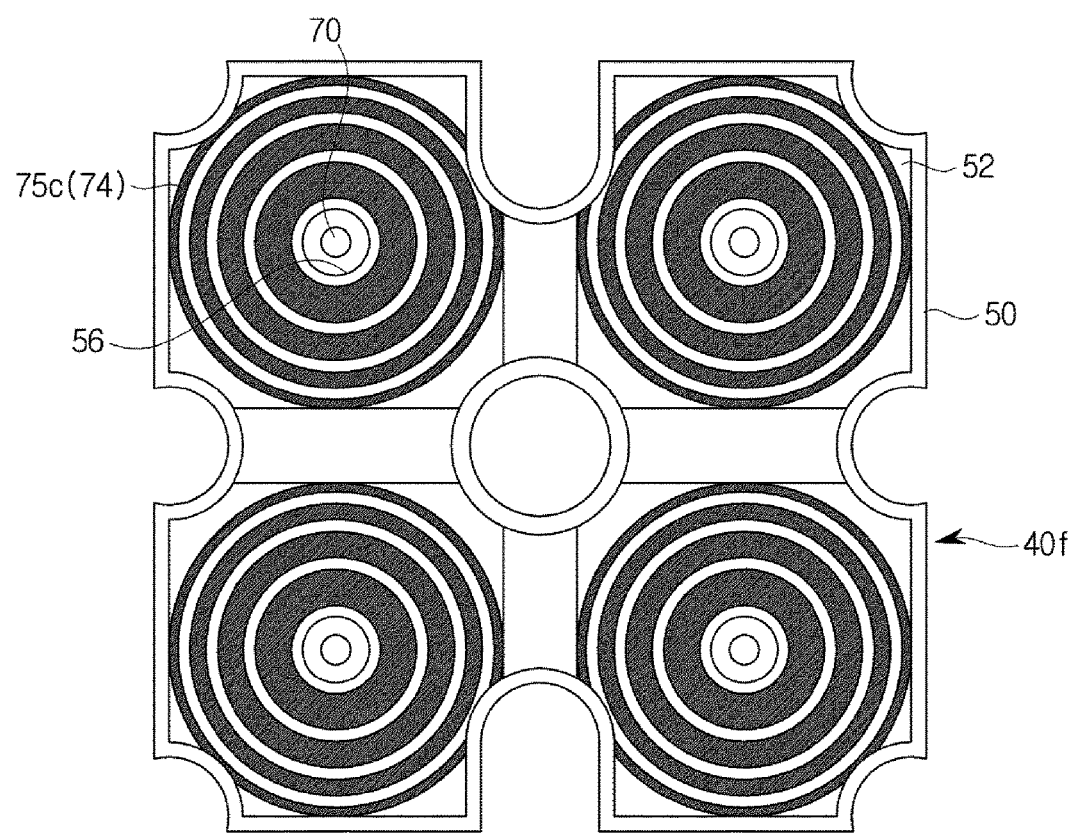
FIG. 11 is a rear-view illustrating a light source module of a display apparatus according to an embodiment.

FIG. 11 is a rear-view illustrating a light source module of a display apparatus according to an embodiment.

A light source module 40f may include a light converter 74.

The light converter 74 may include a light conversion member 75c. The light conversion member 75c may be disposed on a surface of a modulator 50, wherein the surface is the same as a surface on which the light source 70 is disposed. For example, the light conversion member 75c may be disposed on the rear surface of the modulator 50. The light conversion member 75c may be formed to be disposed in a certain pattern on the modulator 50. According to the embodiment, the light conversion member 75c may be formed to be disposed in a plurality of circular shapes on the modulator 50 with respect to the light source 70 as a common center. That is, the light conversion member 75c may be formed such that the plurality of circular shapes are concentrically disposed with respect to the light source 70.

The pattern of the light conversion member 75c may be formed such that a thickness of the shape of the light conversion member 75c adjacent to the light source 70 is greater than a thickness of the shape of the light conversion member 75c disposed further away from the light source 70. That is, the light conversion member 75b may include a first shape formed adjacent to and around the light source 70, and a second shape disposed on the outer side of the first shape. A width of the second shape may be narrower than a width of the first shape. That is, as the shape of the light conversion member 75b is closer to the light source 70, the width thereof may be increased.

The embodiment as illustrated in FIG. 11 may improve the optical conversion efficiency in a region adjacent to the light source 70 where the intensity of light is relatively high.

A display apparatus according to embodiments may implement local dimming.

Further, the color reproducibility may be improved by a light source module structure according to embodiments.

The thickness of the display apparatus may be reduced or minimized by a light source module structure according to embodiments.

While embodiments of the present disclosure have been shown and described, it would be appreciated by those skilled in the art that changes may be made without departing from the principles and spirit of the disclosure, the scope of which is defined in the claims and their equivalents.

What is claimed is:

1. A display apparatus comprising:
   a display panel; and
   a plurality of light source modules disposed in parallel with a rear surface of the display panel and configured to emit light toward the display panel,
   wherein each of the plurality of light source modules comprises:
      a modulator configured to guide light;
      a light source disposed on a rear surface of the modulator and configured to generate light;
      a reflecting member disposed on a front surface of the modulator and opposite to the light source, and configured to reflect the generated light to an inside of the modulator or to the rear surface of the modulator; and
      a light conversion member disposed on the rear surface of the modulator and configured to convert a wavelength of the generated light that is guided by the modulator, the light conversion member being disposed in a predetermined pattern.

2. The display apparatus of claim 1, wherein the predetermined pattern comprises a plurality of shapes formed with respect to the light source as a common center.

3. The display apparatus of claim 2, wherein the plurality of shapes comprises a circle.

4. The display apparatus of claim 2, wherein the plurality of shapes comprises a polygon.

5. The display apparatus of claim 2, wherein the plurality of shapes comprises a first shape disposed adjacent to the light source, a second shape disposed on an outer side of the first shape, and a third shape disposed on the outer side of the second shape, and
   wherein a distance between the second shape and third shape is greater than a distance between the first shape and second shape.

6. The display apparatus of claim 2, wherein the plurality of shapes comprises a first shape disposed adjacent to the light source and a second shape disposed on an outer side of the first shape, and
   wherein a width of the second shape is less than a width of the first shape.

7. The display apparatus of claim 1, wherein the modulator comprises a reflecting concave surface formed on the front surface of the modulator and opposite to the light source, and recessed from the front surface of the modulator toward the rear surface of the modulator, and
   wherein the reflecting member comprises a first reflecting member disposed on the reflecting concave surface and a second reflecting member disposed to cover a concave space formed by the reflecting concave surface.

8. The display apparatus of claim 7, further comprising:
   a central light conversion member disposed in the concave space and configured to convert a wavelength of the light generated from the light source.

9. The display apparatus of claim 1, wherein the modulator comprises a light source concave portion disposed on the rear surface of the modulator and recessed from the rear surface toward the front surface of the modulator, the light source being disposed in the light source concave portion, and
   wherein the display apparatus further comprises a light source conversion member disposed between the light source and the light source concave portion and configured to convert a wavelength of the light generated from the light source.

10. The display apparatus of claim 1, wherein the modulator comprises a pattern engraved portion formed on the rear surface of the modulator to be recessed toward the front surface of the modulator, wherein the light conversion member is disposed in the pattern engraved portion.

11. The display apparatus of claim 1, wherein the reflecting member is disposed at a center of the front surface of the modulator, and the light source is disposed at a center of the rear surface of the modulator.

12. The display apparatus of claim 1, wherein the modulator comprises a light guide plate.

13. The display apparatus of claim 1, wherein the modulator, the light source, the reflecting member, and the light conversion member are integrally formed with each other.

14. The display apparatus of claim 1, wherein the light source is configured to emit blue light, wherein the light conversion member comprises a quantum dot (QD) configured to convert a wavelength of light, and wherein the light conversion member further comprises a yellow QD configured to convert the blue light into white light.

15. A display apparatus comprising:

a display panel; and a plurality of light source modules disposed on a rear side of the display panel and configured to emit light toward the display panel, wherein each of the plurality of light source modules comprises:

a modulator configured to uniformly guide light;

a light source disposed at a center of a first surface of the modulator and configured to generate light;

a reflecting member disposed on a second surface, opposite to the first surface, of the modulator opposite to the light source and configured to reflect the generated light; and a light converter configured to convert optical properties of light guided by the modulator, wherein the light converter comprises:

a central conversion member disposed adjacent to the reflecting member and opposite to the light source; and a light conversion member disposed on an engraved portion, which is formed on the first surface of the modulator and configured to have a predetermined pattern, the light conversion member being disposed in a plurality of shapes with respect to the light source as a common center.

16. The display apparatus of claim 15, wherein the reflecting member is further configured to reflect light generated by the light source, to an inside of the modulator or toward the first surface of the modulator.

17. The display apparatus of claim 15, wherein the light source is disposed at the center of the first surface of the modulator, wherein the reflecting member is further disposed at a center of the second surface of the modulator and opposite to the light source.

18. The display apparatus of claim 15, wherein the modulator comprises a reflecting concave surface disposed opposite to the light source, on the second surface of the modulator, and recessed from the second surface of the modulator toward the first surface, wherein the reflecting member comprises a first reflecting member disposed on the reflecting concave surface and a second reflecting member disposed to cover a concave space formed by the reflecting concave surface, and wherein the central conversion member is disposed in the concave space.

19. The display apparatus of claim 18, wherein the modulator further comprises a light source concave portion formed on the first surface of the modulator and recessed from the first surface of the modulator toward the second surface of the modulator, the light source being disposed in the light source concave portion, wherein the display apparatus further comprises a light source conversion member disposed between the light source and the light source concave portion and configured to convert a wavelength of light generated from the light source.

20. A display apparatus comprising:

a display panel; and a plurality of light source modules disposed in a plane and configured to emit light toward the display panel, wherein each of the plurality of light source modules comprises:

a light source configured to generate light;

a light guide plate comprising a light source concave portion formed on a first surface of the light guide plate, the light source being disposed on the light source concave portion, and a reflecting concave portion formed on a second surface, opposite to the first surface, and configured to uniformly guide light toward the display panel;

a first reflecting member disposed on the reflecting concave portion and a second reflecting member disposed to cover a concave space formed by the reflecting concave portion, the first reflecting member and the second reflecting member being configured to reflect light generated by the light source; and a light conversion member configured convert light generated by the light source or light reflected by at least one of the first reflecting member and the second reflecting member, and disposed on the first surface of the light guide plate in a predetermined pattern with respect to the light source.

* * * * *